United States Patent [19]
Adams et al.

[11] Patent Number: 5,834,534
[45] Date of Patent: Nov. 10, 1998

[54] TIRE INFLATING AND PUNCTURE SEALING COMPOSITION

[75] Inventors: Lawrence J. Adams, Ponte Vedra Beach; Paul D. Hughett, Jacksonville, both of Fla.

[73] Assignee: Engine Fog Inc., Jacksonville, Fla.

[21] Appl. No.: 743,570

[22] Filed: Nov. 4, 1996

Related U.S. Application Data

[63] Continuation of Ser. No. 353,514, Dec. 9, 1994, abandoned.

[51] Int. Cl.⁶ .................................................... B29C 73/00
[52] U.S. Cl. ........................ 523/166; 524/903; 252/305; 252/DIG. 1
[58] Field of Search ........................ 523/166; 524/903; 252/305, DIG. 1

[56] References Cited

U.S. PATENT DOCUMENTS

| | | | |
|---|---|---|---|
| 3,912,666 | 10/1975 | Spitzer et al. | 521/72 |
| 4,031,045 | 6/1977 | Goswami | 521/145 |
| 4,384,661 | 5/1983 | Page et al. | 524/903 |
| 4,501,825 | 2/1985 | Magyar et al. | 521/78 |
| 4,508,853 | 4/1985 | Kluth et al. | 521/129 |
| 4,536,323 | 8/1985 | Stopper | 524/903 |
| 5,188,831 | 2/1993 | Nicoll et al. | 424/63 |
| 5,500,456 | 3/1996 | Hughett et al. | 523/166 |

*Primary Examiner*—Andrew E. C. Merriam
*Attorney, Agent, or Firm*—Lieberman & Nowar, LLP

[57] ABSTRACT

An aerosol propellant comprises a methylene-chloride-in-water water/out emulsion comprising water, methylene chloride and a surfactant and a propellant gas soluble in methylene chloride. A puncture sealing and inflating composition for pneumatic tires includes a methylene-chloride-in-water water/out emulsion comprising water, methylene chloride, and a surfactant; a nonflammable propellant gas soluble in methylene chloride; a curable latex emulsion; and a fibrous plugging/matting agent.

5 Claims, No Drawings

TIRE INFLATING AND PUNCTURE SEALING COMPOSITION

This application is a continuation of application Ser. No. 08/353,514, filed Dec. 9, 1994, now abandoned.

FIELD OF THE INVENTION

The invention broadly concerns a new aerosol propellant composition and a composition for sealing and inflating a punctured pneumatic tire which employs the new aerosol propellant.

BACKGROUND ART

Changing a flat tire on an automobile is generally regarded by consumers as a troublesome chore at best, and, if the flat occurs in certain locations or weather conditions, can be perceived to be a dangerous undertaking. Consequently, aerosol tire sealants and inflators packaged in aerosol containers suitable for carrying in an automobile have gained wide acceptance by consumers.

A conventional tire sealer and inflator composition is disclosed in U.S. Pat. No. 5,338,776 to Peelor et al. The composition of the patent employs two components: a sealing component consisting of an acrylic resin dissolved in a solvent and a propellant component based on a hydrochlorofluorocarbon or a hydrofluorocarbon compound. The composition of the patent is characterized in the patent as anhydrous. Ten solvents are specifically identified in the patent at column 4, lines 39 through 55 as being suitable for the tire sealer and inflator composition of the patent. With exception of methylene chloride, each of the solvents specifically identified has been classified by the State of California as an atmosphere polluting volatile organic compound ("VOC") and its release into the atmosphere is discouraged. Methylene chloride in the liquid state, although not classified as an atmosphere polluting VOC, tends to attack rubber compounds. Introduction of liquid methylene chloride into the cavity of a pneumatic tire would be expected to have an adverse effect on the rubber compounds of the tire.

It would be desirable to use a nonflammable, environmentally inoffensive, essentially inert gas such as air, nitrogen ($N_2$), carbon dioxide ($CO_2$), or helium (He) as a propellant/inflating agent for an aerosol tire sealer and inflator. However, aerosol containers can be pressurized to a pressure of no greater than 180 psig at 130° F., a limit imposed by the United States Department of Transportation for interstate shipping. Moreover, as a practical matter, aerosol containers can be no larger than about one liter in capacity. A one liter vessel containing only an inert gas in a quantity just sufficient to meet the pressurization limit of 180 psig at 130° F. would not contain sufficient gas to pressurize a conventional pneumatic automobile tire to a driveable condition.

Solvents are known which can dissolve sufficient carbon dioxide at a pressure safely contained by ordinary aerosol containers to pressurize a flat tire to a driveable condition. Certain of such carbon-dioxide solvents have vapor pressures of at least roughly 100 mm Hg at about 70° F. and thus could contribute to the pressurization of a tire. Among such low-vapor-pressure carbon-dioxide solvents are furan, tetrahydrofuran, acetonitrile, acetone, methylal, methylene chloride, and 1,1-dichloro-1-fluoroethane. Of the compounds listed, furan, tetrahydrofuran, acetonitrile, acetone, and methylal are flammable and potentially explosive in an air pressurized tire. The solubility of carbon dioxide in 1,1-dichloro-1-fluoroethane is considerably less than the other compounds listed. Moreover, 1,1-dichloro-1-fluoroethane has been classified as an atmosphere polluting volatile organic compound by the State of California and is relatively expensive to manufacture, which prohibits the use of substantial quantities of the compound in an aerosol container. As noted above, methylene chloride has a high solubility parameter with respect to rubber compounds and has the potential in the liquid state to soften or degrade the rubber compounds of rubber tires.

A need exists for an effective and inexpensive tire sealant and inflating composition which is essentially nonflammable, essentially nonexplosive, and essentially non-stratospheric-ozone depleting and which does not contribute unduly to global warming and does not contain high levels of atmosphere polluting volatile organic compounds.

SUMMARY OF INVENTION

We have invented a method to solubilize a propellant gas into a methylene-chloride containing carrier to form an aerosol propellant composition which provides effective shielding tending to prevent liquid methylene chloride from attacking surfaces in which the composition may be in contact. Such an aerosol propellant composition employing a nonflammable propellant gas such as carbon dioxide or sulfur hexafluoride can be used as a component of a composition for sealing and inflating a punctured tire which permits a sufficient quantity of the propellant gas to be introduced into the cavity of the tire to inflate the tire to a driveable condition while effectively shielding rubber-compound interior surfaces of the tire cavity from attack by liquid methylene chloride.

Broadly, the invention concerns an aerosol propellant which comprises a methylene-chloride-in-water water/out emulsion including water, methylene chloride, and a surfactant and a propellant gas soluble in methylene chloride. For many applications, it is preferred that the propellant gas be nonflammable. Carbon dioxide and sulfur hexafluoride are preferred nonflammable propellant gases, with carbon dioxide being particularly preferred for reasons of economy.

In another aspect, the invention concerns a puncture sealing and inflating composition for pneumatic tires which comprises a methylene-chloride-in-water water/out emulsion comprising water, methylene chloride, and a surfactant and a nonflammable propellant gas soluble in methylene chloride. The puncture sealing and inhibiting composition also includes a latex emulsion and a fibrous plugging/matting agent.

Preferably, the nonflammable propellant gas of the puncture sealing and inflating composition of the invention is carbon dioxide, sulfur hexafluoride, or a mixture of carbon dioxide and sulfur hexafluoride. Most preferably, the propellant gas is carbon dioxide.

Preferably, the surfactant of the aerosol propellant and the tire sealing and inflating composition has a hydrophilic-to-lipophilic balance in the direction of greater water solubility than oil solubility.

For the aerosol propellant of the invention, surfactants of the nonionic type are preferred. A particularly preferred nonionic surfactant is an octylphenoxypoly(ethyleneoxy)ethanol.

For the tire sealing and inflating composition of the invention, a blend of nonionic and anionic surfactants is preferred. A particularly preferred surfactant blend for tire sealing and inflating compositions of the invention includes a blend of an octylphenoxypoly(ethyleneoxy)ethanol and sodium lauryl sulfate.

In preferred embodiments of the invention, the methylene-chloride-in-water water/out emulsion is highly stable. In particular, the emulsion does not tend to reverse or partially reverse when subjected to the stress of temperature extremes and mechanical force encountered in filling an aerosol container with the composition, storing the composition in the aerosol container in an automotive vehicle under summer and winter temperature conditions, and transporting the composition within a tire cavity after inflating the tire with the composition as the vehicle is driven about.

In the preferred embodiments of the puncture sealing and inflating composition of the invention, the latex emulsion is a synthetic nitrile latex emulsion such as an ABS polymer latex emulsion.

A preferred fibrous plugging/matting agent of the puncture sealing and inflating composition of the invention is a fibrous cellulosic material. A particularly preferred fibrous cellulosic plugging/matting agent is an a-cellulose fiber filter aid.

Preferred methylene-chloride-in-water water/out emulsions of the invention are microemulsions that are stable over a wide range of mechanical and environmental stress such as are encountered in the interior of a automotive vehicle tire. Such methylene-chloride-in-water microemulsions enable carbon dioxide to be dissolved in the methylene chloride of the microemulsion while effectively tending to shield the rubber of a tire containing the microemulsion from deleterious contact with liquid methylene chloride.

BASIC PARAMETERS OF THE INVENTION

The surfactant of the methylene-chloride-in-water water/out composition of the invention preferably has a hydrophilic-to-lipophilic balance parameter of about 16 or greater.

Preferred surfactants with high hydrophilic-to-lipophilic-balance parameters tend to keep methylene chloride trapped inside the methylene-chloride-in-water water/out emulsion of the compositions of the invention. As the temperature increases or the pressure decreases inside a tire cavity, methylene chloride in the form of a gas will tend to evaporate from the emulsion. As the temperature decreases or pressure increases, microdroplets of methylene chloride will tend to be condensed from the atmosphere inside the tire cavity, and because of the relative high weight density of the droplets and the molecular attraction of the high hydrophilic to lipophilic balance emulsion system, the microdroplets will tend to be rapidly encapsulated back into the methylene-chloride-in-water emulsion, which tends to keep the rubber compounds of the tire and the soft latex coating which is formed by the composition protected from liquid methylene chloride.

Preferred puncture sealing and inflating compositions of the invention include a latex emulsion which, as it dries, tends to cure to a soft rubbery film on inside surfaces of the tire cavity and in any puncture hole in the tire. Preferably, the latex emulsion is a synthetic nitrile latex emulsion with a particle size distribution with particles in the range of from roughly 800 to roughly 3000 Å in diameter. More preferably, the synthetic latex emulsion has an average particle size of roughly 1700 Å. A particularly preferred latex emulsion is commercially available under the trade name "Hycar" nitrile latex emulsion 1578x1 from B. F. Goodrich Company of Cleveland, Ohio.

A particularly preferred fibrous plugging/matting agent for the tire sealing and inflating composition of the invention is an α-cellulose fiber filter aid having an average fiber length of about 700 μm.

Even when a tire inflated using a preferred puncture sealing and inflating composition of the invention has not been rotated, a large percentage—perhaps 90 percent or more—of the inside surface of the tire is ordinarily contacted by the water/out emulsion of the composition. The water/out emulsion contains a curable latex and the fibrous plugging/matting agent. The latex and the plugging/matting agent slowly form a soft rubbery film inside of the tire cavity. Rotation of the tire as the latex cures tends to cause the soft rubbery film to form over essentially the entire inner surface of the tire cavity, which tends to ensure that the puncture will be plugged wherever it is located.

Latex emulsions containing nitrile, acrylamide, acrylonitrile, butadiene, styrene, polyacrylate, epichlorohydrin, polyurethane, and polyvinyl chloride are considered environmental hazards and generally should not be permitted to enter ground water or waterways. The use of a fibrous plugging/matting agent in the tire sealing and inflating composition of the invention tends to prevent such materials from escaping through puncture holes in tires. In preferred tire sealing and inflating compositions of the invention, puncture holes in the tire of up to roughly 3/16 inch in diameter—or even greater—can be plugged. The latex materials tend to remain in the tire and gradually attach to inside tire surfaces. Eventually the tire with the cured latex materials inside can be disposed of properly by a hazardous waste disposer for automobile tires.

In the table and examples below, the following abbreviations and trade names are used.

"Hycar" nitrile latex emulsion 1578x1 is an ABS emulsion polymer containing about 50 percent water and about 48–50 percent of a nitrile polymer which is commercially available from B. F. Goodrich Company of Cleveland, Ohio. The latex emulsion also contains roughly two percent of the anionic surfactant sodium lauryl sulfate.

IGEPAL CA-897 is an octylphenoxypoly(ethylenoxy) ethanol surfactant commercially available from Rhone-Poulenc of Cranbury, N.J.

The designation "Mazon RI6" is a trade name of a surface active corrosion inhibitor commercially available from PPG Industries, Inc. of Gurnee, Ill.

The designation "Epoxol 9-5" is a trade name of epoxidized triglyceride commercially available from Swift Edible Oil Co. The epoxidized triglyceride contains a minimum of about 11 percent oxirane groups and can function as an acid scavenger.

The designation "Fibra-Cel SW-10" is a trade name of an α-cellulose fiber filter aid commercially available from Celite Corporation of Lompoc, Calif. The "Fibra-Cel SW-10" filter aid has an average fiber length of about 700 μm, is approximately 80 percent retained by a +400 mesh sieve and has a density of about 2.4 lbs/ft$^3$.

Tire sealing and inflating compositions with the ingredients listed in the table below in the concentration ranges given are preferred:

| ingredient | approximate range parts by weight |
| --- | --- |
| Deionized water | 0.0–74.2 |
| "Hycar" nitrile latex emulsion 1578 x 1 | 2.0–30.0 |
| IGEPAL CA-897 | 0.3–7.0 |
| "Mazon RI-6" | 0.1–0.5 |
| Triethanolamine (99%) | 0.1–1.0 |

-continued

| ingredient | approximate range parts by weight |
|---|---|
| "Epoxol 9-5" | 0.0–1.0 |
| "Fibra-Cel SW-10" | 0.1–2.0 |
| Methylene chloride | 20.0–76.0 |
| Other solvents | 0.0–15.0 |
| $SF_6$ | 0.0–7.5 |
| $CO_2$ | 2.8–8.7. |

EXAMPLES

Microemulsion compositions were prepared in the following Examples using a laboratory blender available from John Oster Manufacturing Company of Milwaukee, Wisconsin under the trade name "Osterizer Cycle Blend Model 847." The blending referred to in each of the Examples may be carried out substantially as follows. Add the ingredients listed in the Example from the first ingredient, deionized water, through the fibrous plugging/matting agent ingredient "Fibra-Cel SW-10" to the blender. Then begin blending with the blender set on low speed. Increase the speed of the blender stepwise to the "mix" setting. Blend for about three minutes at the "mix" setting. Add the solvent or solvents rapidly while blending at the "mix" setting. When all solvents have been added, close the cover of the blender and blend for about three minutes to form a microemulsion composition. Add the desired quantity of the microemulsion composition to an aerosol container. Place a valve in the aerosol container and crimp into place. Pressurize the aerosol container with $CO_2$ or $SF_6$, or a combination of the two, using a gasser/shaker machine to an equilibration pressure in the aerosol unit of about 110 psig at approximately 70° F. Suitable gasser/shaker machines are available commercially from Terco, Inc. of Schaumburg, Ill. and BWI-KP Aerofil of Davenport, Iowa.

| Example No. 1 | |
|---|---|
| ingredient | approximate parts by weight |
| Deionized water | 31.022 |
| "Hycar" nitrile latex emulsion 1578 × 1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Methylene chloride | 54.378 |
| $CO_2$ | 4.000 |

The ingredients were blended substantially according to the procedure set forth above to produce a microemulsion composition. An aerosol container was charged with the microemulsion composition and with carbon dioxide as set forth above. The charge of microemulsion composition and carbon dioxide totalled about 16 oz in weight.

The microemulsion was stable at temperatures in the range of from about −50° F. to about 200° F. Over the temperature range of from −50° to about 200° F., the pressure ranged from approximately 0 to approximately 300 psi.

The composition of Example 1 is essentially nonflammable, essentially nonexplosive, and essentially non-stratospheric-ozone depleting. The composition does not contribute to global warming to an extent significantly greater than carbon dioxide alone and does not include any ingredient classified as an atmosphere polluting volatile organic compound by the State of California.

When the methylene-chloride containing microemulsion composition of Example 1 was placed into contact with an inside surface of a rubber tire for thirty days during which time the time was driven approximately 1500 miles, the inside tire surface gave no evidence of attack by the composition.

To test the tire sealing capabilities of the microemulsion composition, a 205×75×15" size tire mounted on an automotive vehicle was punctured with a 20 p nail. The nail was removed and the tire allowed to go flat to the street surface. The aerosol unit containing the approximately 16 oz avoirdupois charge of microemulsion composition and carbon dioxide was connected to the valve of the flat tire and the charge allowed to flow and expand into the tire. The outside air temperature was between about 60° F. and about 80° F. The rim lifted off the street surface one to three inches. The vehicle was then driven one mile. The puncture hole was effectively sealed on the first revolution of the tire. The tire pressure after the tire had been driven one mile was about 11 psig. At the end of approximately five miles, the tire pressure was about 13 psig, and at the end of approximately ten miles, the tire pressure was about 15 psig. After the vehicle had been driven for about 103 miles at an average speed of about 65 mph, the tire pressure was measured and found to have remained at about 15 psig. The test tire was then pressurized with air to approximately 30 psig. The tire pressure was then rechecked after a drive of about 50 miles. The tire pressure had dropped to about 23 psig, showing an increased solubility of $CO_2$ in the microemulsion composition at the increased pressure. The test tire was then repressurized to approximately 30 psig. After 30 days and approximately 1500 miles, the pressure was found to be holding constant at about 28 psig. A similar tire driven on a laboratory spinner for 12 months held an essentially constant pressure of approximately 28 psig.

| Example No. 2 | |
|---|---|
| ingredient | approximate parts by weight |
| Deionized water | 30.550 |
| "Hycar" nitrile latex emulsion 1578 × 1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Methylal | 11.000 |
| Methylene chloride | 43.500 |
| $CO_2$ | 4.350 |

The ingredients listed above were blended substantially according to the procedure set forth above to form a microemulsion composition. The microemulsion composition was introduced into an aerosol container which was then charged with $CO_2$ to approximately 110 psig at about 70° C. in substantially the manner described above.

The composition of Example 2 is only marginally flammable, essentially nonexplosive, and essentially non-stratospheric-ozone depleting. The composition contributes to an increase in global warming to an extent only very slightly greater than carbon dioxide and contains only about eleven percent by weight of compounds which have been classified by the State of California as atmospheric polluting volatile organic compounds.

The composition of Example 2 was discharged from the aerosol container into a second tire which had been punctured with a 20 p nail on the same vehicle as the tire of Example 1. Pressures were measured for the two tires at essentially the same times. The results for the formula of Example 2 were substantially the same as for the formula of Example 1, with the exception that the tire pressure ranged from about 10.5 psig after approximately one mile of driving to about 15.5 psig after approximately ten miles of driving. The pressure in the tire charged with the formula of Example 2 showed a greater variation with temperature than did the pressure in the tire charged with the formula of Example 1. This test tire held substantially constant pressure at about 29 psig after 30 days and approximately 1500 miles of driving.

Example No. 3

| ingredient | approximate parts by weight |
| --- | --- |
| Deionized water | 30.600 |
| "Hycar" nitrile latex emulsion 1578 × 1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Acetone | 11.000 |
| Methylene chloride | 43.500 |
| $CO_2$ | 4.350 |

The ingredients listed above were blended and charged into an aerosol container substantially as described above. Results obtained from the stability study were essentially the same as those obtained with the microemulsion compositions of Examples 1 and 2. Tire pressures were the substantially same as those found for the microemulsion composition of Example 2.

The composition of Example 3 is only marginally flammable, essentially nonexplosive, and essentially non-stratospheric-ozone depleting. The composition contributes to an increase in global warming to an extent only slightly greater than carbon dioxide and contains only about eleven percent by weight of compounds which have been classified by the State of California as atmospheric polluting volatile organic compounds.

Example No. 4

| ingredient | approximate parts by weight |
| --- | --- |
| Deionized water | 19.770 |
| "Hycar" nitrile latex emulsion 1578 × 1 | 7.174 |
| IGEPAL CA-897 | 1.739 |
| "Mazon RI-6" | .300 |
| Triethanolamine (99%) | .500 |
| "Epoxol 9-5" | .300 |
| "Fibra-Cel SW-10" | .587 |
| Methylene chloride | 65.217 |
| $CO_2$ | 5.000 |

The ingredients listed above were blended substantially according to the procedure set forth above and charged into an aerosol container as described.

The composition of Example 4 is essentially nonflammable, essentially nonexplosive, and essentially non-stratospheric-ozone depleting. The composition does not contribute to global warming to an extent significantly greater than carbon dioxide alone and does not include any ingredient classified as an atmosphere polluting volatile organic compound by the State of California.

A 205×75×15" tire was attached to a laboratory tire spinner set to turn at approximately 30 rpm. The valve core was removed to depressurize the tire. After reinstalling the valve core, an aerosol unit containing about 16 oz avoirdupois was attached to the valve and the valve fully actuated. The unit took approximately 50 seconds to discharge into the tire. The aerosol unit was then disconnected. The tire was spun approximately one minute and then the pressure was checked. The pressure in the tire was approximately 11 psig at ambient temperature.

Example No. 5

| ingredient | approximate parts by weight |
| --- | --- |
| Deionized water | 35.480 |
| "Hycar" nitrile latex emulsion 1578 × 1 | 7.174 |
| IGEPAL CA-897 | 1.739 |
| "Mazon RI-6" | .300 |
| Triethanolamine (99%) | .500 |
| "Epoxol 9-5" | .300 |
| "Fibra-Cel SW-10" | .587 |
| Methylene chloride | 60.000 |
| $SF_6$ | 3.920 |

The ingredients were blended and the resulting microemulsion composition tested substantially as described in Example 4. The pressure in the tire was about 8 psig.

The composition of Example 5 is essentially nonflammable, essentially nonexplosive, and essentially non-stratospheric-ozone depleting. The composition does not contribute to global warming to an extent significantly greater than carbon dioxide alone and does not include any ingredient classified as an atmosphere polluting volatile organic compound by the State of California.

Example No. 6

| ingredient | approximate parts by weight |
| --- | --- |
| Deionized water | 24.810 |
| "Hycar" nitrile latex emulsion 1578 × 1 | 7.174 |
| IGEPAL CA-897 | 1.739 |
| "Mazon RI-6" | .300 |
| Triethanolamine (99%) | .500 |
| "Epoxol 9-5" | .300 |
| "Fibra-Cel SW-10" | .987 |
| Methylene chloride | 60.000 |
| $SF_6$ | 1.220 |
| $CO_2$ | 3.370 |

The ingredients listed above were blended and the resulting microemulsion composition tested as described in Example 4. The pressure in the tire was found to be approximately 9 psig.

The composition of Example 6 is essentially nonflammable, essentially nonexplosive, and essentially non-stratospheric-ozone depleting. The composition does not contribute to global warming to an extent significantly greater than carbon dioxide alone and does not include any ingredient classified as an atmosphere polluting volatile organic compound by the State of California.

Example No. 7

| ingredient | approximate parts by weight |
| --- | --- |
| Deionized water | 20.660 |
| "Hycar" nitrile latex emulsion 1578 × 1 | 7.174 |
| IGEPAL CA-897 | 1.739 |
| "Mazon RI-6" | .300 |
| Triethanolamine (99%) | .900 |
| "Epoxol 9-5" | .300 |
| "Fibra-Cel SW-10" | .587 |
| 1,1,2,Trichloroethylene | 65.220 |
| $CO_2$ | 3.520 |

The ingredients listed above were blended and the resulting microemulsion composition tested as described in Example 4. The pressure in the tire was found to be approximately 7 psig.

The composition of Example 7 is essentially nonflammable, essentially nonexplosive, and essentially non-stratospheric-ozone depleting. The composition contributes to an increase in global warming to an extent significantly greater than carbon dioxide and contains about 65.22 percent by weight of compounds which have been classified by the State of California as atmospheric polluting volatile organic compounds.

Example No. 8

| ingredient | approximate parts by weight |
| --- | --- |
| Deionized water | 30.704 |
| "Hycar" nitrile latex emulsion 1578 × 1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Furan | 10.870 |
| Methylene chloride | 43.478 |
| $CO_2$ | 4.348 |

The ingredients listed above were blended substantially according to procedure described above. An aerosol unit was filled to a total contents weight including $CO_2$ of about 460 gms. The average quantity expelled from the aerosol unit into a deflated 205×75×15" tire was found to be about 450 gms. Using the test procedure set forth in Example 4, the pressure in the tire was about 11 psig at approximately 70°–72° F.

The composition of Example 8 is only marginally flammable, essentially nonexplosive, and essentially non-stratospheric-ozone depleting. The composition contributes to an increase in global warming to an extent only slightly greater than carbon dioxide and contains only about 10.87 percent by weight of compounds which have been classified by the State of California as atmospheric polluting volatile organic compounds.

Example No. 9

| ingredient | approximate parts by weight |
| --- | --- |
| Deionized water | 42.118 |
| "Hycar" nitrile latex emulsion 1578 × 1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Methylene chloride | 43.478 |
| $CO_2$ | 3.804 |

The ingredients listed above were blended substantially according to procedure described above. An aerosol unit was filled to a total contents weight including $CO_2$ of about 460 gms. The average quantity expelled from the aerosol unit into a deflated 205×75×15" tire was found to be about 450 gms. Using the test procedure set forth in Example 4, the pressure in the tire was about 9 psig at approximately 70°–72° F.

The composition of Example 9 is essentially nonflammable, essentially nonexplosive, and essentially non-stratospheric-ozone depleting. The composition does not contribute to global warming to an extent significantly greater than carbon dioxide alone and does not include any ingredient classified as an atmosphere polluting volatile organic compound by the State of California.

Example No. 10

| ingredient | approximate parts by weight |
| --- | --- |
| Deionized water | 30.704 |
| "Hycar" nitrile latex emulsion 1578 × 1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| 1,1-dichloro-1-fluoroethane (G-141b) | 10.870 |
| Methylene chloride | 43.478 |
| $CO_2$ | 4.022 |

The ingredients listed were blended substantially according to the procedure set forth above. An aerosol unit was filled to a total contents weight including $CO_2$ of about 460 gms. Using the test procedure set forth in Example 4, the pressure in the tire was found to be approximately 11 psig at about 70°–72° F.

The composition of Example 10 is essentially nonflammable, essentially nonexplosive, and essentially non-stratospheric-ozone depleting. The composition contributes to global warming to an extent significantly greater than carbon dioxide alone and includes 1,1-dichloro-1-fluoroethane which has been classified as an atmosphere polluting volatile organic compound by the State of California.

It is not intended to limit the present invention to the specific embodiments described above. For example, the aerosol propellant of the invention may be employed as a propellant for compositions other than the tire sealing and inflating composition of the invention or tire sealing and inflating compositions in general. The composition of the invention may include ingredients in addition to those described above. It is recognized that these and other changes may be made in the compositions specifically described herein without departing from the scope and teachings of the instant invention, and it is intended to encompass all other embodiments, alternatives, and modifications consistent with the present invention.

What is claimed is:

1. An aerosol propellant useful in puncture sealing and inflating compositions for pneumatic tires, comprising:
   (a) a water/out emulsion comprising water, methylene chloride, and a water/out-emulsion-stabilizing surfactant, the surfactant having a hydrophilic-to-lipophilic balance parameter of greater than 16;
   (b) a propellant gas selected from the group consisting of:
      (i) carbon dioxide
      (ii) sulfur hexafluoride and
      (iii) mixtures of carbon dioxide and sulfur hexafluoride;
   (c) an amine; and
   (d) an acid scavenger,
   said aerosol propellant being stable at a temperature of from about $-50°$ F. to about $200°$ F. and at a pressure sufficient to enable the composition to be discharged from a conventional aerosol container and wherein when the aerosol propellant is confined under pressure in a conventional aerosol container it is capable of incorporating an amount of propellant gas which when released is sufficient to pressurize a conventional pneumatic automobile tire to a driveable condition.

2. The aerosol propellant of claim 1 wherein the propellant gas is carbon dioxide.

3. The aerosol propellant of claim 1 in which the amine is triethanolamine.

4. The aerosol propellant of claim 1 in which the acid scavenger includes oxirane groups.

5. The aerosol propellant of claim 4 in which the acid scavenger is an triglyceride.

* * * * *